(12) United States Patent
Kaganovich

(10) Patent No.: US 9,111,444 B2
(45) Date of Patent: Aug. 18, 2015

(54) VIDEO AND LIDAR TARGET DETECTION AND TRACKING SYSTEM AND METHOD FOR SEGMENTING MOVING TARGETS

(71) Applicant: Raytheon Company

(72) Inventor: Vitaliy M. Kaganovich, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/665,560

(22) Filed: Oct. 31, 2012

(65) Prior Publication Data

US 2014/0118716 A1    May 1, 2014

(51) Int. Cl.
| | |
|---|---|
| *G01C 3/08* | (2006.01) |
| *G08G 1/04* | (2006.01) |
| *G01S 17/89* | (2006.01) |
| *G01S 7/48* | (2006.01) |

(Continued)

(52) U.S. Cl.
CPC ............... *G08G 1/04* (2013.01); *G01S 7/4808* (2013.01); *G01S 17/89* (2013.01); *G06K 9/3241* (2013.01); *G06T 7/0038* (2013.01); *G06T 7/0044* (2013.01); *G06T 7/2053* (2013.01); *G08G 1/056* (2013.01); *G06T 2207/10028* (2013.01); *G06T 2207/20032* (2013.01); *G06T 2207/20036* (2013.01); *G06T 2207/20144* (2013.01)

(58) Field of Classification Search
CPC ...................................... G01S 17/58
USPC ............................ 356/4.01, 3.01, 5.01, 9, 625
See application file for complete search history.

(56) References Cited

U.S. PATENT DOCUMENTS

| | | |
|---|---|---|
| 4,937,878 A | 6/1990 | Lo et al. |
| 5,150,426 A | 9/1992 | Banh et al. |

(Continued)

FOREIGN PATENT DOCUMENTS

| | | |
|---|---|---|
| WO | WO-2014077928 A2 | 5/2014 |
| WO | WO-2014077928 A3 | 5/2014 |

OTHER PUBLICATIONS

"Israel Application Serial No. 218825, Voluntary Amendment filed Jul. 3, 2012", 7 pgs.

(Continued)

*Primary Examiner* — Luke Ratcliffe
*Assistant Examiner* — Samantha K Abraham
(74) *Attorney, Agent, or Firm* — Schwegman Lundberg & Woessner, P.A.

(57) ABSTRACT

Embodiments of video and LIDAR target detection and tracking system and method for segmenting targets are generally described herein. In some embodiments, the system may perform moving target detection using three-frame difference processing on frames of LIDAR range images of a scene to identify a moving target and determine an initial position estimate for the moving target. The system may also perform segmentation of the moving target using a single frame of the LIDAR range images to generate a segmented target that may include a target mask and target centroid position. After segmentation, moving target registration including motion compensation may be performed by registering the segmented target in multiple LIDAR frames to determine a target position, a target orientation and a target heading. In some embodiments, a three-dimensional model of the moving target may be generated and added to a sequence of video frames.

20 Claims, 7 Drawing Sheets

(51) Int. Cl.

| | |
|---|---|
| G06K 9/32 | (2006.01) |
| G08G 1/056 | (2006.01) |
| G06T 7/00 | (2006.01) |
| G06T 7/20 | (2006.01) |

(56) References Cited

U.S. PATENT DOCUMENTS

| | | | |
|---|---|---|---|
| 5,960,097 | A | 9/1999 | Pfeiffer et al. |
| 6,049,363 | A | 4/2000 | Courtney et al. |
| 6,144,366 | A * | 11/2000 | Numazaki et al. ............ 345/156 |
| 7,460,689 | B1 | 12/2008 | Chan |
| 7,483,551 | B2 | 1/2009 | Chen et al. |
| 7,817,185 | B2 * | 10/2010 | Kurata ....................... 348/208.1 |
| 7,865,015 | B2 | 1/2011 | Chen et al. |
| 7,933,464 | B2 | 4/2011 | Zhang et al. |
| 8,238,605 | B2 | 8/2012 | Chien et al. |
| 8,611,600 | B2 | 12/2013 | Newman et al. |
| 2005/0129316 | A1 * | 6/2005 | Curti et al. .................... 382/224 |
| 2009/0059201 | A1 * | 3/2009 | Willner et al. ................ 356/5.01 |
| 2010/0004861 | A1 * | 1/2010 | Park et al. ..................... 701/301 |
| 2011/0234581 | A1 * | 9/2011 | Eikelis et al. ................. 345/419 |
| 2012/0200667 | A1 * | 8/2012 | Gay et al. ........................ 348/43 |
| 2013/0094694 | A1 | 4/2013 | Newman et al. |

OTHER PUBLICATIONS

"International Application Serial No. PCT/US2013/056833, Invitation to Pay Additional Fees and Partial Search Report mailed Jul. 23, 2014", 5 pgs.

Kumar, Rakesh, et al., "Aerial Video Surveillance and Exploitation", Proceeding of the IEEE US, vol. 89, No. 10, (Oct. 1, 2001).

Sergey, Matyunin, et al., "Temporal filtering for depth maps generated by Kinect depth camera", 3DTV Conference the true vision—Capture, Transmission and display of 3D Video, (May 16, 2011), 1-4.

"International Application Serial No. PCT/US2013/056833, International Search Report mailed Sep. 29, 2014", 6 pgs.

"International Application Serial No. PCT/US2013/056833, Written Opinion mailed Sep. 29, 2014", 7 pgs.

"Israel Application Serial No. 218825, Office Action mailed Dec. 8, 2014", 4 pgs.

Bergen, James R., et al., "A Three-Frame Algorithm for Estimating Two-Component Image Motion", IEEE Transactions on Pattern Analysis and Machine Intelligence, 14(9), (Sep. 1992), 886-896.

Collins, Robert T., et al., "A System for Video Surveillance and Monitoring", Tech. Report CMU-RI-TR-00-12, Robotics Institute, Carnegie Mellon University, (May 2000), 1-69.

Migliore, Davide A., et al., "A Revaluation of Frame Difference in Fast and Robust Motion Detection", Proceedings of ACM International Workshop on Video Surveillance and Sensor Networks (VSSN), Santa Barabara, CA, (Oct. 2006), 215-218.

"U.S. Appl. No. 13/271,700, Non Final Office Action mailed Apr. 16, 2013", 7 pgs.

"U.S. Appl. No. 13/271,700, Notice of Allowance mailed Aug. 15, 2013", 11 pgs.

"U.S. Appl. No. 13/271,700, Response filed Jul. 10, 2013 to Non Final Office Action mailed Apr. 16, 2013", 11 pgs.

"Israeli Application Serial No. 218825 Response filed Mar. 30, 2015 to Section 18 Request mailed Dec. 8, 2014", With the English claims, 8 pgs.

"International Application Serial No. PCT/US2013/056833, International Preliminary Report on Patentability mailed May 14, 2015", 9 pgs.

* cited by examiner

VIDEO AND LIDAR TARGET DETECTION AND TRACKING SYSTEM AND METHOD FOR SEGMENTING MOVING TARGETS

GOVERNMENT RIGHTS

This invention was not made with United States Government support. The United States Government does not have certain rights in this invention.

RELATED APPLICATION

This application is related to patent application entitled "THREE-FRAME DIFFERENCE MOVING TARGET ACQUISITION SYSTEM AND METHOD FOR TARGET TRACK IDENTIFICATION" Ser. No. 13/271,700 filed Oct. 12, 2011.

TECHNICAL FIELD

Embodiments pertain to target detection and target tracking. Some embodiments pertain to remote optical sensing. Some embodiments pertain to target detection and target tracking systems that use video and Light Detection And Ranging (LIDAR) techniques. Some embodiments pertain to three-dimensional (3D) target modeling.

BACKGROUND

One issue with conventional video target trackers is that they have difficulty tracking targets partially obscured by tree branches, transmission towers, and other obstructions, especially if the target is obscured from the outset. Another issue with conventional video target trackers is that they can be confused by shadows and road markings causing a loss of lock. Another issue with conventional video target trackers is that performance degrades in situations when contrast is low. Another issue with conventional video target trackers is that they lock onto a high-contrast part of the target such as a wheel or shadow instead of the target centroid making tracking more difficult or reducing tracking accuracy.

Thus, there are general needs for improved target trackers and methods for tracking targets. There are also needs for target trackers and methods for tracking targets that have less difficulty tracking targets that are partially obscured. There are also needs for target trackers and methods for tracking targets that are not confused by non-objects such as shadows and road markings. There are also needs for target trackers and methods for tracking targets suitable for operation in low-contrast situations.

SUMMARY

Embodiments of a video and LIDAR target detection and tracking system and method for segmentation of moving targets are generally described herein. In some embodiments, the system may perform moving target detection using three-frame difference processing on frames of LIDAR range images of a scene to identify a moving target and determine an initial position estimate for the moving target. The system may also perform segmentation of the moving target using a single frame of the LIDAR range images to generate a segmented target that may include a target mask and target centroid position. After segmentation, moving target registration including motion compensation may be performed by registering the segmented target in multiple LIDAR frames to determine a target position, a target orientation and a target heading. A three-dimensional (3D) model of the moving target may be generated and added to a sequence of video frames.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
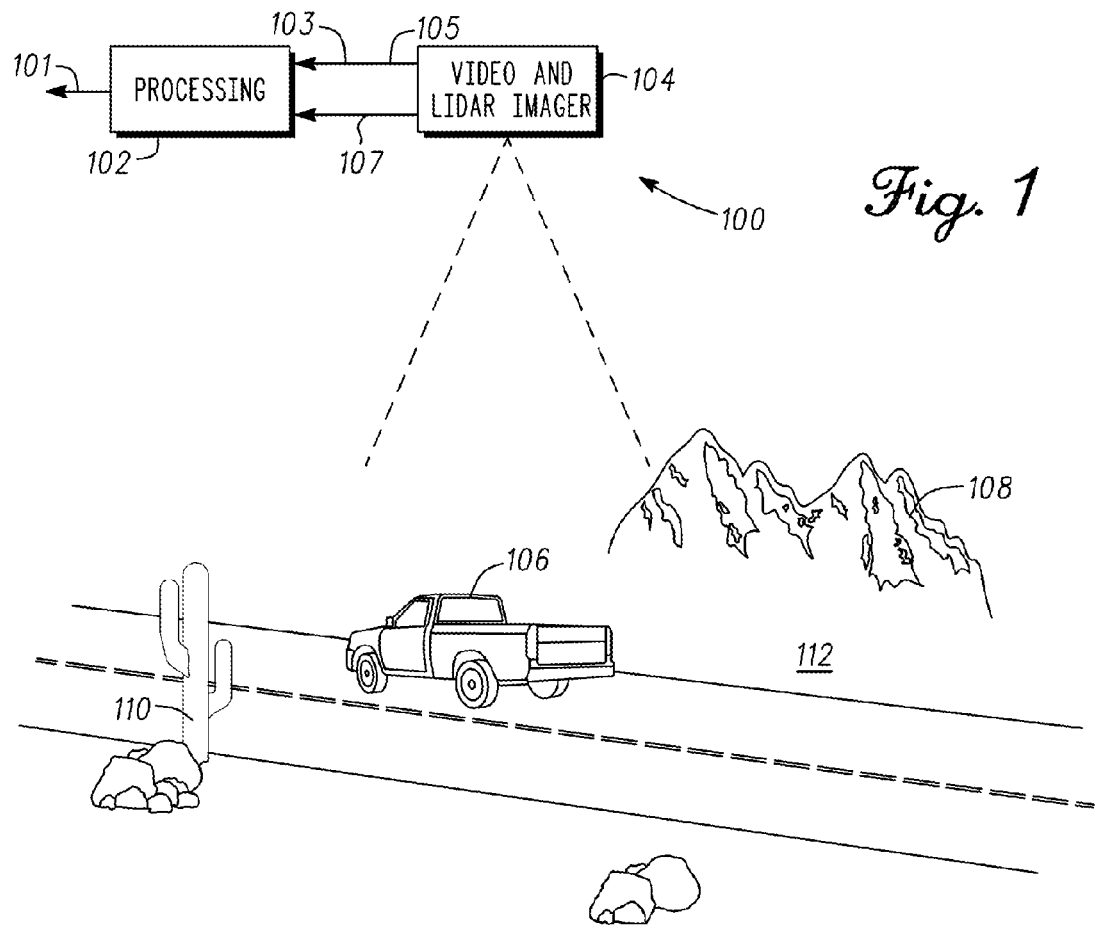
FIG. 1 illustrates the operational environment of a video and LIDAR target detection and tracking system in accordance with some embodiments.

FIG. 1 illustrates the operational environment of a video and LIDAR target detection and tracking system in accordance with some embodiments. The video and LIDAR target detection and tracking system 100 may include an imager 104 and processing circuitry 102. In some embodiments, the imager 104 may include a LIDAR imager portion which may generate LIDAR frames 103 of LIDAR range images of a scene 112. The imager 104 may also include a video imager portion which may generate video frames 105 of the scene 112. The imager 104 may also provide data 107 (e.g., metadata) related to the LIDAR frames 103 and the video frames 105 for use by the processing circuitry 102. The LIDAR frames 103 may comprise LIDAR range images.

The video and LIDAR target detection and tracking system 100 exploits LIDAR range images or depth maps to segment a target from background and clutter 108 to find the target's centroid in world coordinates. The video and LIDAR target detection and tracking system 100 may first detect a moving target by performing a three-frame-difference process on the LIDAR range images. One advantage of using LIDAR range images is that there is no need to assume the scene 112 is flat, and time-aliasing artifacts in the residual image appear to be below ground and are easy to eliminate. The detections may be used to initialize tracks, which may be tracked with a correlation-based video tracking process that may segment the target from background and foreground clutter 108 using a LIDAR range image. Once the target is segmented, the system may refine the track position to identify the segmented target's centroid. The range images may be converted to height maps to facilitate target segmentation and tracking of heavily obscured targets. Since LIDAR range images do not show shadows or surface markings and contrast is unaffected by color or lighting, the target's centroid in world coordinates may be calculated from a 3D point cloud of the un-obscured parts of the whole target (i.e., rather than a shadow or a high-contrast part of the target).

In accordance with embodiments, the processing circuitry 102 may perform moving target detection using three-frame difference processing on the frames 103 of LIDAR range images of the scene 112 to identify a moving target 106 and determine an initial position estimate for the moving target 106. The processing circuitry 102 may also perform segmentation of the moving target 106 using a single frame of the LIDAR range images to segment the target 106 from background clutter 108 and foreground occlusions 110. These embodiments are described in more detail below. One suitable three-frame difference processing technique is described in Unites States patent application entitled "THREE-FRAME DIFFERENCE MOVING TARGET ACQUISITION SYSTEM AND METHOD FOR TARGET TRACK IDENTIFICATION" Ser. No. 13/271,700 filed Oct. 12, 2011, incorporated herein by reference, although other processing techniques may be used to initially identify a moving target 106.

In some embodiments, after segmentation, the processing circuitry 102 may perform moving target registration that may include motion compensation by registering the segmented target in multiple LIDAR frames 103 to determine a target position, a target orientation and a target heading. In these embodiments, by segmenting a target 106 from background and foreground clutter 108, tracking the target 106 from frame-to-frame, and registering the target 106 in multiple frames, a 3D model of the moving target 106 can be generated. In some embodiments, the 3D model may be added to the video frames 105 to generate an output 101. These embodiments are described in more detail below.

In some embodiments, the video and LIDAR target detection and tracking system 100 may warp one range image onto another. In these embodiments, not only are pixel positions warped, but their colors (i.e., height values) are also warped, because objects in range images change height/color as their range changes. In some embodiments, three-frame-difference moving target acquisition may be performed on video frames 105 instead of LIDAR range images to identify a moving target 106. In some embodiments, the system may include a two-dimensional (2D) correlator to evaluate multiple local correlation peaks in a cross-correlation surface and select the best one. In this way, only parts of the reference image may need to be updated. This increases robustness to partial occlusions. In some embodiments, the video and LIDAR target detection and tracking system 100 may perform target 106 segmentation to segment a target 106 from background clutter 108 and foreground clutter 110 in a range image. Furthermore, the track position of the target 106 may be refined by using the segmented target's centroid. In some embodiments, the video and LIDAR target detection and tracking system 100 may employ an unstructured point cloud tracker. These embodiments are discussed in more detail below.

Figure 2:
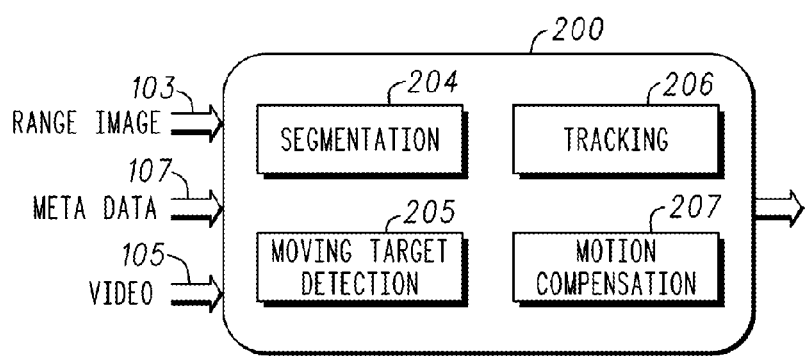
FIG. 2 is a functional block diagram of processing modules of processing circuitry in accordance with some embodiments.

FIG. 2 is a functional block diagram of processing modules of the processing circuitry in accordance with some embodiments. Processing circuitry 200 may be suitable for use as processing circuitry 102 (FIG. 1), although other configurations may also be suitable. Processing circuitry 200 may include a segmentation module 204, a moving target detection module 205, a tracking module 206 and a motion compensation module 207.

Figure 3A:
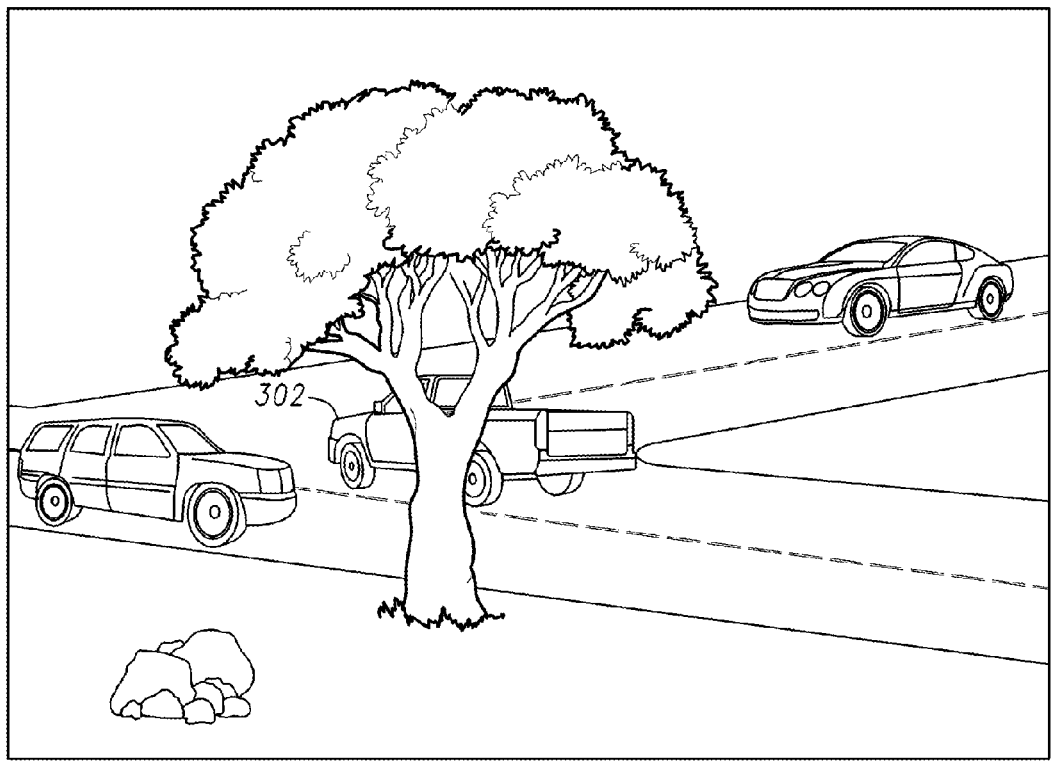
FIG. 3A is a sketch of an image of a scene in accordance with some embodiments.

In accordance with embodiments, the moving target detection module 205 may perform moving target detection using three-frame difference processing on frames of LIDAR range images 103 (FIG. 1) of a scene 300 (see FIG. 3A) to identify a moving target 302 and determine an initial position estimate for the moving target 302. In some embodiments, moving target detection module 205 may perform moving target detection using three-frame difference processing on frames of video frames 105 (FIG. 1) of a scene 300 (see FIG. 3A) to identify a moving target 302 and determine an initial position estimate for the moving target 302.

Figure 3B:
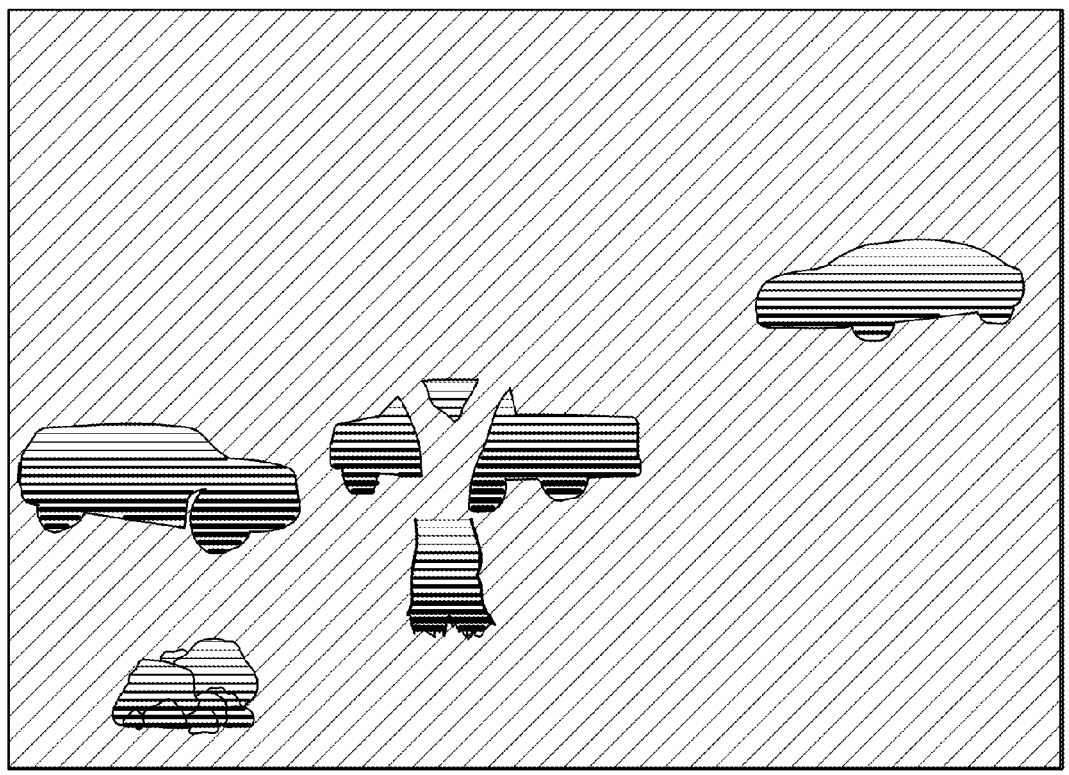
FIG. 3B is a sketch of a height image in accordance with some embodiments.

The segmentation module 204 may perform segmentation of the moving target 302 using a single frame of the frames 103 of LIDAR range images. The segmentation may include transforming the single frame of the LIDAR range images within a track window to a height image 310 (see FIG. 3B). In height image 310, the pixel values may correspond to heights of objects in the scene 300 within a predetermined range of heights. The segmentation may also include thresholding-out pixels of the height image 310 below a height threshold to remove the ground, and above a second height threshold to remove taller occlusions 110 in the height image 310 to generate a binary segmented target image 320 (see FIG. 3C) or bitmask. These embodiments are described in more detail below.

In some embodiments, the segmentation may include applying a median filter to the single frame of the LIDAR range image to temporarily fill-in (bridge) gaps. Depth discontinuities in the LIDAR range image may be identified after the gaps are filled. The depth discontinuities may be identified using an image gradient of the LIDAR range image. The segmentation may further include nulling-out pixels of the segmented target image 320 that correspond to the depth discontinuities. After nulling-out the pixels that correspond to the depth discontinuities, boundaries (i.e., blob boundaries) within the segmented target image 320 may be established to identify potential targets such as segmented target 322 (see FIG. 3C).

Figure 3C:
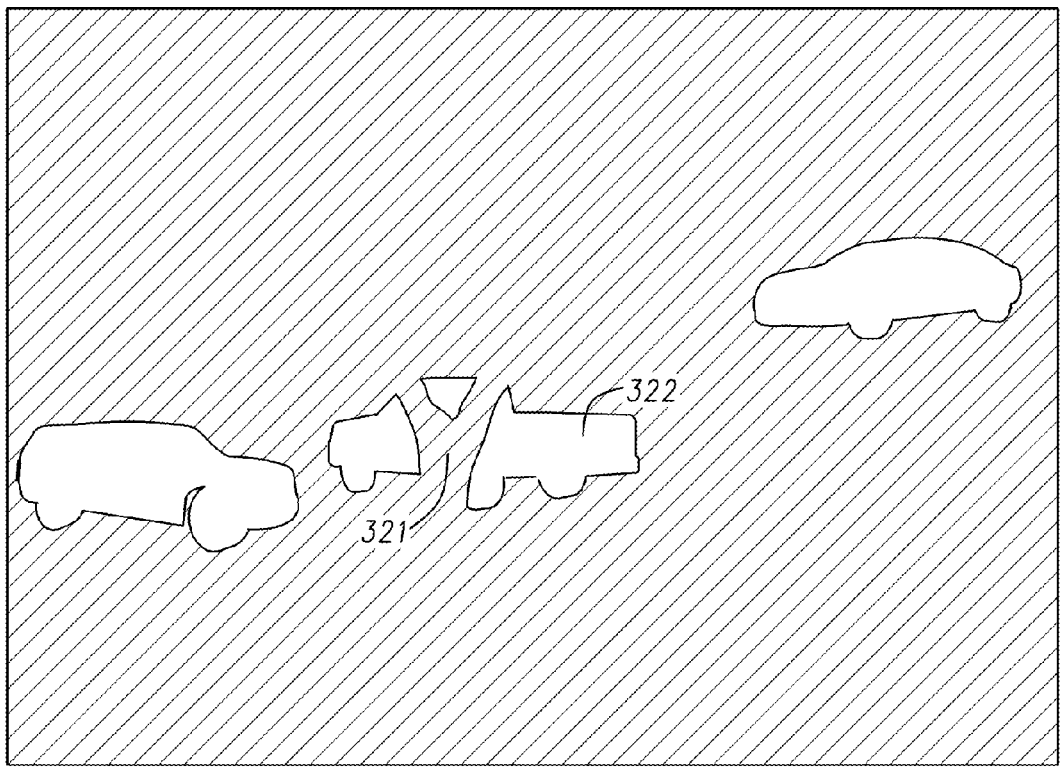
FIG. 3C is a sketch of a segmented target image in accordance with some embodiments.

In some embodiments, the pixel values of the height image 310 (FIG. 3B) that correspond to a height may be represented by colors or may correspond to colors, although the scope of the embodiments is not limited in this respect. As illustrated in FIG. 3C, gaps or holes in the segmented target image 320 may include areas within a potential target that may have been blocked by a tall occlusion 110 such as branches of a tree or a cactus. In these embodiments, thresholding-out pixel values of the height image 310 above a predetermined value that is based on the target height (e.g., three meters above the ground) to remove tall occlusions 110 may remove things such as a tree or branches in the height image 310. By thresholding-out pixel values, the respective pixels may be set to null in the LIDAR range image, the height image 310, and the segmented target image 320.

In some of these embodiments, the segmentation module 204 may perform segmentation of the moving target 302 using a single frame of the LIDAR range images to generate the segmented target 322 (with the gaps filled in) including a target mask and target centroid position. These embodiments are described in more detail below.

In some embodiments, the segmentation process may include filtering the potential targets (e.g., blobs) based on a predetermined size threshold to identify at least one target of interest (e.g., near a center of the track window). The segmented target image 320 and a target mask for each of the identified targets of interest may be generated based on the filtering.

In some embodiments, the median filter, which is used to fill gaps, may be configured to replace each null pixel of the range image with the median of the pixels within a window around the null pixel. In this way, the gaps or holes in the range image resulting from the thresholding may be filled in. For example, after deleting tall objects (like tree branches) based on their height above ground, there may be gaps, such as gap 321, left in the range image where those branches were. In some embodiments, a small 3×3 pixel window may be used for the median filter, although the scope of the embodiments is not limited in this respect as the window size may be selected depending on the size of the occlusion 110. In some embodiments, the application of the median filter may be iterated until most or all the gaps 321 are filled in. The parameters for the median filter may be selected so that the application of the median filter does not eliminate jumps between surfaces in the range image (i.e., a jump in range from a car to the building behind it).

The segmentation process may also include determining a three-dimensional (3D) target centroid for each of the targets of interest within the range image, setting the 3D target centroid as the target location, and updating a 3D velocity of the target 302. In these embodiments, an initial target velocity may have been determined by the three-frame difference processing discussed above. In some embodiments, the target velocity at frame n may be estimated as follows:

$$\text{velocity}[n]=\text{velocity}[n-1]+k^*(\text{position}[n]-\text{position}[n-1]-\text{velocity}[n-1])=(1-K)^*\text{velocity}[n-1]+k^*(\text{position}[n]-\text{position}[n-1]).$$

In the above equation, 'k' is a tunable constant that may have a value between 0 and 1. In these embodiments, the target velocity is calculated using an alpha filter or exponential filter. In other embodiments, a more sophisticated Kalman filter may be used in which k may be the Kalman gain. In some embodiments, acceleration as well as velocity may be estimated.

In some embodiments, the segmentation process may also include determining an image gradient of the LIDAR range image after the gaps are filled in to identify the potential target boundaries. In these embodiments, the gradient operation may be used to detect jumps (depth discontinuities) in the range values which correspond to distances between objects or targets allowing potential targets to be separated. The pixels corresponding to the depth discontinuities are then set to Null in the segmented target image 320.

In some embodiments, the segmentation process may also include generating histogram values of the height image 310 (FIG. 3B), estimating a ground height from the histogram values, and determining one or more height thresholds for the height image 310 for use in thresholding-out ground pixel values. The histogram values may represent a histogram. In some embodiments, different height thresholds may be used for different portions (track windows) of the image (i.e., at ground level, or on top of a roof of a building). This allows different targets 302 to be segmented and tracked at different elevations.

After segmentation, a moving target registration process may be performed which may include motion compensation performed by motion compensation module 207 (FIG. 2). In these embodiments, the motion compensation process may include registering the segmented target in multiple LIDAR frames to determine a target position, a target orientation and a target heading. In some embodiments, the moving target registration process may include performing an interactive closest point (ICP) process to refine frame-to-frame registration.

Figure 3D:
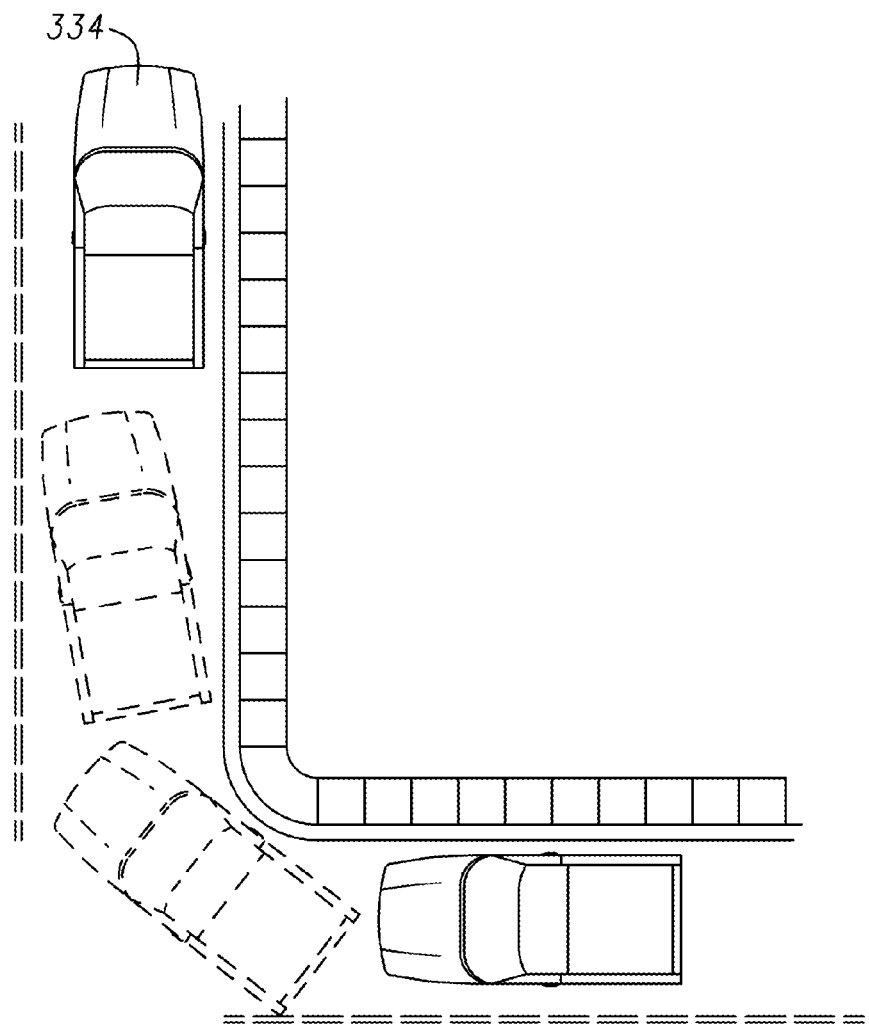
FIG. 3D is a sketch of a scene including a three-dimensional (3D) model of a moving target in accordance with some embodiments.

In these embodiments, by segmenting a target 302 from background and foreground clutter 108 & 110, tracking the target 302 from frame-to-frame, and registering the target 302 in multiple frames, a three-dimensional (3D) model 334 (see FIG. 3D) of the moving target 302 (FIG. 3A) may be generated. The 3D model 334 may be added to a sequence of video frames 105 as shown in FIG. 3D.

Although processing circuitry 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of processing circuitry may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, one or more processors may be included and may be configured with instructions stored on a computer-readable storage device.

In accordance with some embodiments, the segmentation of an initially detected moving target 302 may refine an initial position estimate of the moving target 302 (FIG. 3A) that was determined by the three-frame difference processing. In these embodiments, the segmentation and registration may be part of modeling a dynamic scene 300 with moving targets 302 and occlusions 110. In particular, building a 3D model of a moving target 302 includes segmenting the target 302 from clutter 108, tracking the target 302 from frame to frame, and registering the target 302 seen in multiple frames.

In some embodiments, the segmentation processing may be used to generate 3D models of one or more vehicles in a scene 300, including moving and stopped vehicles. In some embodiments, static structures (e.g., trees and buildings) may be segmented using different parameters to model these different types of structures providing an option to allow these structures to be hidden in the final 3D model of the scene 300. In some embodiments, segmentation and registration may be facilitated by exploiting hybrid EO data, including range images (i.e., depthmaps) and multiple spectral bands.

In accordance with embodiments, the input to the segmentation process performed by segmentation module 204 may include preprocessed imagery and corrected pointing data generated in a previous preprocessing step. The output of the segmentation process may include an array of object tracks in which each track includes the object's position and 2D mask (i.e., silhouette) in each input frame where the object was segmented. In some embodiments, the output of segmentation process may include velocities in the case of moving target objects.

After an object is tracked and segmented over multiple frames, its 3D point cloud from each frame may be registered into the object's coordinate system centered on the object to facilitate model building. The input to this registration step may include the track information generated in the segmentation step, in addition to the preprocessed imagery and corrected pointing data generated in the preprocessing step. The output may include the object's registered point cloud in the object's coordinate system and the translation vector and rotation angles to place the registered object and its model back into world coordinates (as shown in FIG. 3D).

In some embodiments, the system 100 may provide a target tracker that detects, tracks, and segments moving targets 302. In some embodiments, when new targets 302 are detected, a new track may be initialized. To help prevent the same track from being detected multiple times, a distance threshold may be used to eliminate detections that are too close to existing tracks.

As discussed above, moving objects may be detected with a modified three-frame-difference algorithm operating on range images 103 whose pixel values are ranges. In these embodiments, the first step may include registering three depthmaps (designated as f1, f2, and f3) separated in time by an interval (e.g., 20 frames or ⅔ seconds). The depthmaps f1 and f3 may be registered with depthmap f2 by projecting f2's pixels into f1's and f3's coordinates. The corresponding pixels may be selected from f1 and f3 and projected back into f2's coordinates. Three-frame-difference processing may be applied to these three registered depthmaps (designated as r1, r2, and r3) to find the residual based on the following equation:

residual=(abs(2*r2−r1−r3)−abs(r3−r1))/2*sign(r2−r1);

Although range maps don't show moving shadows, one advantage of using range images is that there's no need to assume the scene is flat. Time-aliasing artifacts in the residual image appear to be below ground and may be eliminated as follows: residual(residual>0)=0;

Next, thresholding may be performed on the residual image and small holes may be filled in using a morphological closing process. Blobs may be found using connected components filtering based on a size threshold (e.g., to distinguish vehicles from rocks). The detections may indicate the 2D centroids of the blobs.

Since moving target detection alone may not be able to handle move-stop-move cases, in some embodiments, a tracker may be used to initialize new tracks where movers were detected. Shifts may be estimated by performing a modified 2D correlation in a predetermined spectral band and the velocity may be estimated with a filter, such as an alpha-beta filter although the scope of the embodiments is not limited in this respect. At each frame, the tracker may be configured to attempt to segment a target from background and foreground clutter using the range image and when it succeeds, the track position may be refined to be the segment's centroid. This allows heavily obscured targets to be tracked.

Figure 4:
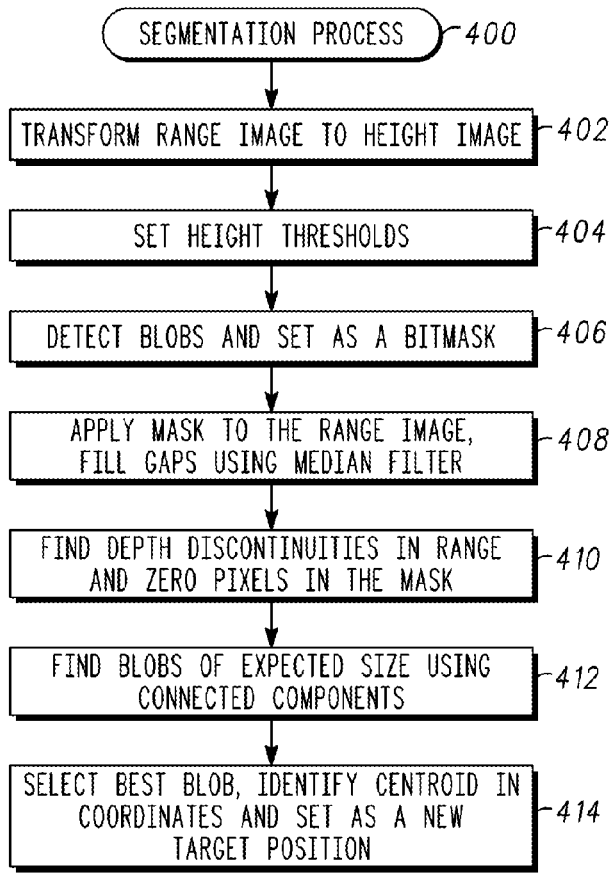
FIG. 4 is a target segmentation procedure in accordance with some embodiments.

FIG. 4 is a segmentation procedure in accordance with some embodiments. Segmentation procedure 400 may be performed by segmentation module 204 (FIG. 2). Segmentation procedure 400 may perform segmentation of the moving target 302 using a single frame of the LIDAR range images to generate a segmented target 322 including a target mask and target centroid position.

Target segmentation starts with transforming the range image within the track window into a height image 310. The ground height may be estimated from the histogram of the height image 310. The ground and anything more than 3 meters, for example, above ground may be then removed by thresholding (i.e., threshold-out) leaving holes wherever the target 302 was occluded by a high object like a stoplight or a tree branch (per operation 404).

Operation 406 comprises detecting blobs and setting as a bitmask. To prevent breaking up the target 302, small holes are filled in with morphological closing, hole filling, opening, and dilation, but this step can connect two targets 302 with each other. Operation 408 comprises applying the mask to the range image and filling the gaps using median filter. In this case, there is a depth discontinuity, or a jump in range between the objects (per operation 410). A gradient of the range image would detect this, but it would also detect all the tall occlusions 110. In accordance with embodiments, tall occlusions 110 in the range image are first eliminated and the holes remaining are filled in by the application of a median filter. The gradient may be found to detect jumps in range that establish the object's boundaries. Next, blobs may be identified using connected components without crossing the depth discontinuities. The detected blobs that meet a size threshold (per operation 412) may be filtered. The blob closest to the center of the track window may be selected. Ground and tall occlusions 110 may be removed because they are not part of the target 302 (per operation 414). The blob may be the segmented target mask. Finally, the 3D centroid of the range image within the blob may be set as the 3D target location, and the 3D velocity may be updated.

Figure 5:
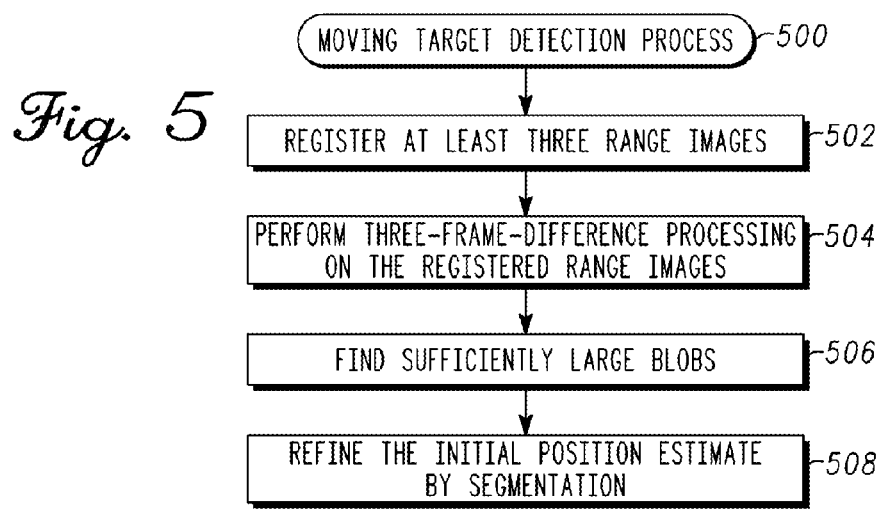
FIG. 5 is a moving target detection procedure in accordance with some embodiments.

FIG. 5 is a moving target detection procedure in accordance with some embodiments. Moving target detection procedure 500 may be performed by moving target detection module 205 (FIG. 2), although this is not a requirement.

Operation 502 comprises registering at least three range images. Operation 504 comprises performing three-frame-difference processing on the registered range images as discussed above. Operation 506 comprises finding sufficiently large blobs (based on an estimated target size threshold). Operation 508 comprises refining the position estimate by segmentation (e.g., procedure 400).

Figure 6:
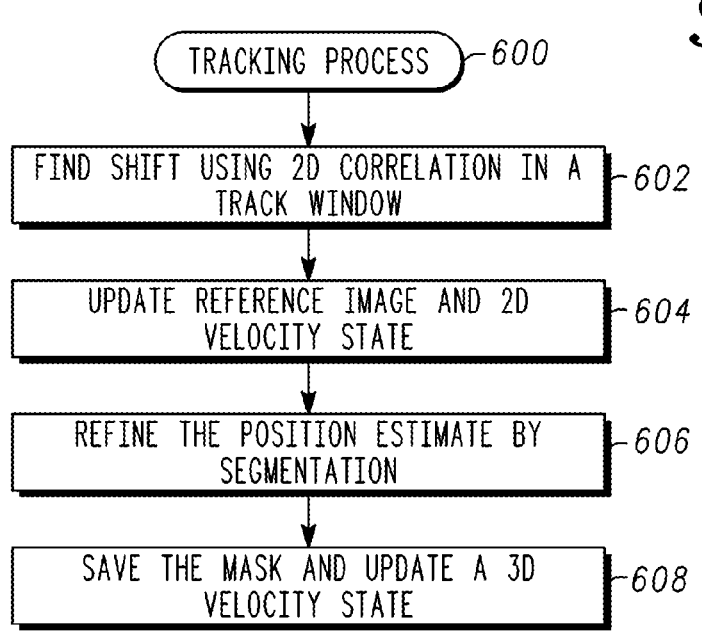
FIG. 6 is a tracking procedure in accordance with some embodiments.

FIG. 6 is a tracking procedure in accordance with some embodiments. Tracking procedure 600 may be performed by tracking module 206, although this is not a requirement. Operation 602 comprises finding shift using 2D correlation in a track window. Operation 604 comprises updating the reference image and 2D velocity state. Operation 606 comprises refining the position estimate by segmentation per procedure 400 (FIG. 4). Operation 608 comprises saving the mask and updating a 3D velocity state.

Figure 7:
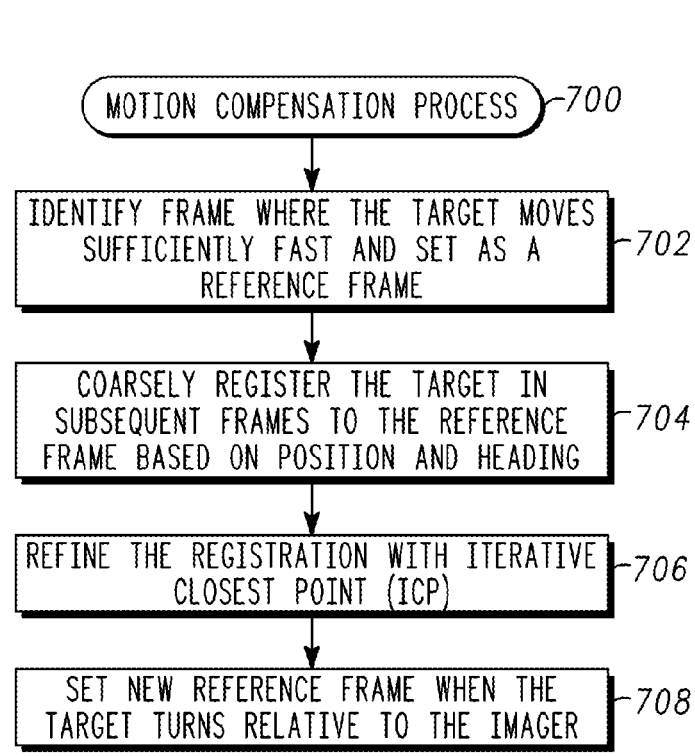
FIG. 7 is a motion compensation procedure in accordance with some embodiments.

FIG. 7 is a motion compensation procedure in accordance with some embodiments. Motion compensation procedure 700 may include moving target registration and may be performed by motion compensation module 207 (FIG. 2), although this is not a requirement. Moving target registration may start by finding a video frame 105 where the target 302 is moving sufficiently fast, and setting it as a reference where the target coordinate system is centered (per operation 702). The target 302 segmented in other video frames 105 is first coarsely registered to the reference frame by undoing the change in the target's 3D position and heading (see operation 704). The same transformation may be applied to the camera to find its position in the target coordinate system. If its position has changed between the current frame and the reference frame, it means the camera observed the target from a new angle because either the target turned or the camera orbited. In this case, the registration may be refined with an iterative closest point (ICP) algorithm (per operation 706), which may be constrained to estimate a change in heading but not in tilt or roll angles. ICP works best with a good initial estimate and with the target segmented from the ground. If the target is not segmented from the ground, the registration error doesn't decrease much between iterations, so ICP quits prematurely.

Registering all frames to a single reference frame may break down when the target is viewed from a different side and there's little overlap between the parts of the target seen in a given frame and the reference frame. On the other hand, registering a target between consecutive frames and accumulating all the transformations may cause errors to accumulate. In accordance with embodiments, to address these issues, the reference may be updated only when the camera position in the target coordinate system changes sufficiently (per operation 708). Then, the reference point clouds can include the left side, front, right side, and back of the target and the frames in between may be registered to the closest reference frame.

The registration step may produce a transformation from world coordinates into target coordinates in each frame where the target was registered. The inverse transformation places the registered point cloud back into world coordinates. This same transformation places the final target model into world coordinates in the final scene model. The transformation may need to be interpolated for the frames where the target was not registered. This may be done by interpolating the translation vector and the heading angle between registered frames with a cubic spline.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A target detection and tracking system comprising:
    a moving target detection module to perform moving target detection using three-frame difference processing on frames of LIDAR range images of a scene to identify a moving target and determine an initial position estimate for the moving target,
        each LIDAR range image being formed from illumination of the scene with infrared laser light and analysis of round trip travel time of the infrared laser light collected from the scene,
        each LIDAR range image comprising a depth map of the scene, each LIDAR range image being unaffected by shadows, surface markings, color, and lighting; and
    a segmentation module to perform segmentation of the moving target using a single frame of the LIDAR range images to generate a segmented target including a target mask and target centroid position.

2. The system of claim 1 wherein the segmentation module is configured to:
    transform the single frame of the LIDAR range images within a track window to a height image wherein pixel values of the height image correspond to heights of objects in the scene;
    threshold out pixels of the height image to remove ground pixels and occlusions in the height image to generate a segmented target image;
    apply a median filter to the single frame of the LIDAR range image to fill in gaps;
    identify depth discontinuities in the LIDAR range image after the gaps are filled;
    null-out pixels of the segmented target image that correspond to the depth discontinuities; and
    establish boundaries within the segmented target image to identify potential targets.

3. The system of claim 2 wherein the segmentation module is further configured to:
    filter the potential targets based on a predetermined size threshold to identify at least one target of interest; and
    generate the segmented target image and a target mask for each of the identified targets of interest based on the filtering.

4. The system of claim 3 wherein the segmentation module is further configured to:
    determine a three-dimensional (3D) target centroid for each of the targets of interest within the range image;
    set the 3D target centroid as the target location; and
    update a 3D velocity of the target.

5. The system of claim 4 wherein the segmentation module is further configured to determine an image gradient of the LIDAR range image after the gaps are filled in to identify the depth discontinuities, and
    wherein the boundaries are established within the segmented target image after nulling-out the pixels that correspond to depth discontinuities to identify potential targets.

6. The system of claim 2 wherein the segmentation module is further configured to:
    generate histogram values of the height image;
    estimate a ground height from the histogram values; and
    determine one or more height thresholds for the height image for use in thresholding out pixel values.

7. The system of claim 4 further comprising a motion compensation module,
    wherein after segmentation, the motion compensation module is configured to perform moving target registration including motion compensation by registering the segmented target in multiple LIDAR frames to determine a target position, a target orientation and a target heading.

8. The system of claim 7 wherein the motion compensation module is further configured to perform an interactive closest point (ICP) to refine frame-to-frame registration.

9. A video and LIDAR target detection, tracking and segmentation method comprising:
    performing moving target detection using three-frame difference processing on frames of LIDAR range images of a scene to identify a moving target and determine an initial position estimate for the moving target,
        each LIDAR range image being formed from illumination of the scene with infrared laser light and analysis of round trip travel time of the infrared laser light collected from the scene,
        each LIDAR range image comprising a depth map of the scene, each LIDAR range image being unaffected by shadows, surface markings, color, and lighting; and
    performing segmentation of the moving target using a single frame of the LIDAR range images to generate a segmented target including a target mask and target centroid position.

10. The method of claim 9 wherein performing segmentation comprises:
    transforming the single frame of the LIDAR range images within a track window to a height image wherein pixel values of the height image correspond to heights of objects in the scene;

thresholding-out pixels of the height image to remove ground pixels and occlusions in the height image to generate a segmented target image;

applying a median filter to the single frame of the LIDAR range image to fill in gaps;

identifying depth discontinuities in the LIDAR range image after the gaps are filled, the depth discontinuities being identified using an image gradient of the LIDAR range image;

nulling-out pixels of the segmented target image that correspond to the depth discontinuities; and establishing boundaries within the segmented target image to identify potential targets.

11. The method of claim 10 wherein performing segmentation further comprises:

filtering the potential targets based on a predetermined size threshold to identify at least one target of interest; and generating the segmented target image and a target mask for each of the identified targets of interest based on the filtering.

12. The method of claim 11 wherein performing segmentation further comprises:

determining a three-dimensional (3D) target centroid for each of the targets of interest within the range image;

setting the 3D target centroid as the target location; and updating a 3D velocity of the target.

13. The method of claim 12 wherein performing segmentation further comprises determining an image gradient of the LIDAR range image after the gaps are filled in to identify the depth discontinuities, and wherein the boundaries are established within the segmented target image after nulling-out the pixels that correspond to depth discontinuities to identify potential targets.

14. The method of claim 10 wherein the segmentation further comprises:

generating histogram values of the height image;

estimating a ground height from the histogram values; and determining one or more height thresholds for the height image for use in thresholding out pixel values.

15. The method of claim 12 further comprising, after segmentation, performing moving target registration including motion compensation by registering the segmented target in multiple LIDAR frames to determine a target position, a target orientation and a target heading.

16. The method of claim 15 wherein performing moving target registration further comprises performing an interactive closest point (ICP) to refine frame-to-frame registration.

17. A method for target image segmentation comprising:

transforming a LIDAR range image within a track window to a height image wherein pixel values of the height image correspond to heights of objects in a scene, the LIDAR range image being formed from illumination of the scene with infrared laser light and analysis of round trip travel time of the infrared laser light collected from the scene, the LIDAR range image comprising a depth map of the scene, the LIDAR range image being unaffected by shadows, surface markings, color, and lighting;

thresholding-out pixels of the height image to remove ground pixels and occlusions in the height image to generate a segmented target image;

applying a median filter to the LIDAR range image to fill in gaps;

identifying depth discontinuities in the LIDAR range image after the gaps are filled, the depth discontinuities being identified using an image gradient of the LIDAR range image;

nulling-out pixels of the segmented target image that correspond to the depth discontinuities; and establishing boundaries within the segmented target image to identify potential targets.

18. The method of claim 17 further comprising:

filtering the potential targets based on a predetermined size threshold to identify at least one target of interest; and generating the segmented target image and a target mask for each of the identified targets of interest based on the filtering.

19. The method of claim 18 further comprising:

determining an image gradient of the LIDAR range image after the gaps are filled in to identify the depth discontinuities, and wherein the boundaries are established within the segmented target image after nulling-out the pixels that correspond to depth discontinuities to identify potential targets.

20. The method of claim 18 further comprising:

generating histogram values of the height image;

estimating a ground height from the histogram values; and determine one or more height thresholds for the height image for use in thresholding out pixel values.

* * * * *